March 13, 1956  A. VON MOHRENSTEIN  2,738,241
HYDRODYNAMIC BEARING
Filed July 16, 1952
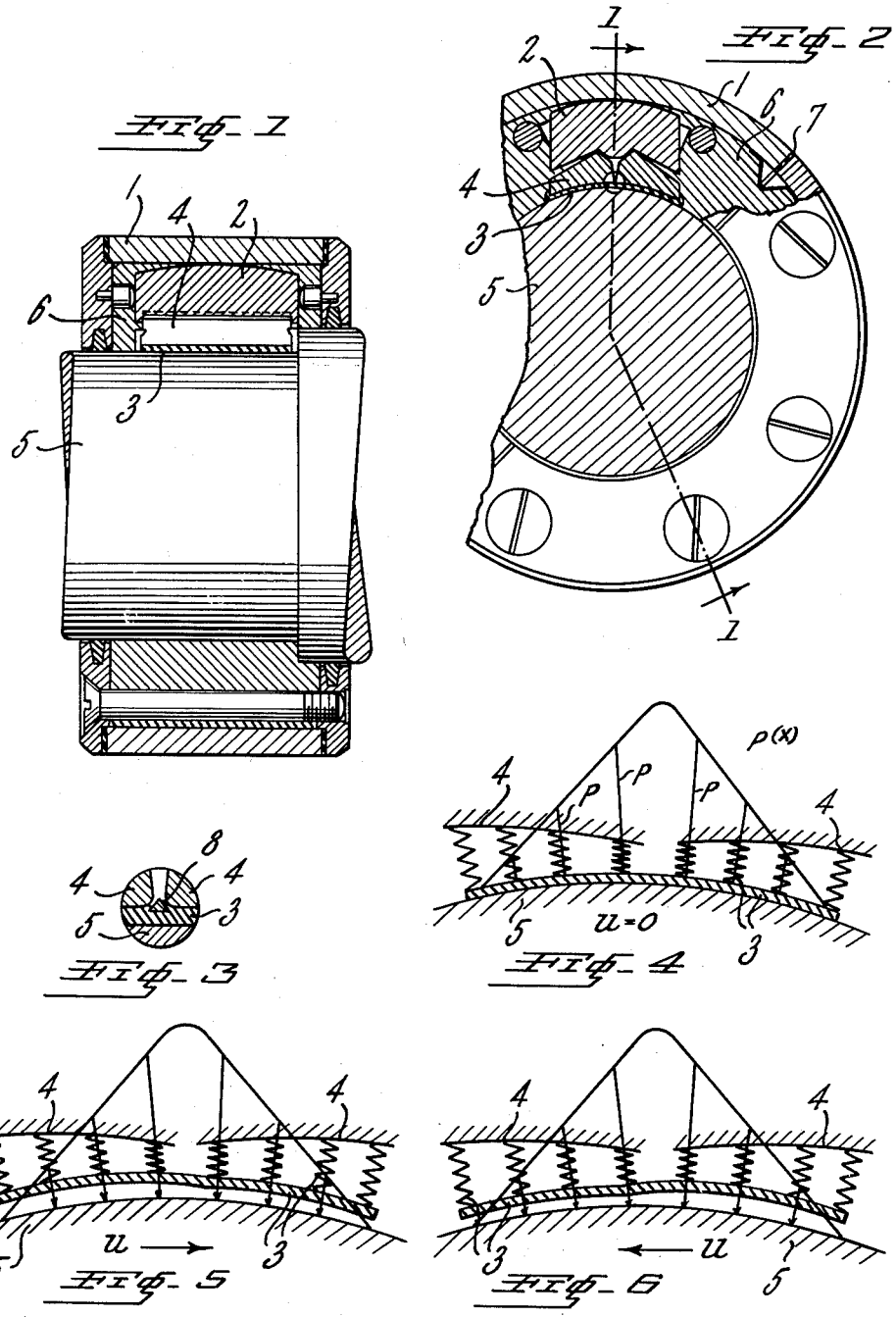
INVENTOR.
ALEXANDER VON MOHRENSTEIN

United States Patent Office

2,738,241
Patented Mar. 13, 1956

2,738,241

HYDRODYNAMIC BEARING

Alexander von Mohrenstein, Freiburg im Breisgau, Germany, assignor to the firm Kugelfischer Georg Schafer & Co., Schweinfurt, Germany, a German company Application July 16, 1952, Serial No. 299,183

10 Claims. (Cl. 308—73)

In the hitherto known hydrodynamic bearings for rotating or sliding members in which there is a layer of lubricating liquid between a rotating shaft or sliding member on the one hand and a bearing support on the other, the space for the reception of the lubricant has been given a fixed and predetermined shape, for example of wedge-like form. In many cases this space was bounded by two arcuate surfaces.

All such bearings, in which the lubricant space has a fixed and pre-determined shape, have only a small supporting power, because the accuracy of manufacture and therefore the minimum height of the lubricant space is limited. Further, almost always the relative movement of the rotating shaft or sliding member and the bearing support can take place only in a definite direction as, for example, in the case of the movement of a shaft rotating in a clockwise sense.

These disadvantages are obviated by the present invention in which, in a hydrodynamic bearing having at least one supporting or bearing member, the latter is elastic and lies close against the sliding or rotating surface when the sliding surface is at rest, and the load is distributed along the bearing surface in such a manner that it is a maximum in the centre and zero at both ends, and when in operation, a thin film of lubricant forms between the sliding or rotating surfaces and the supporting member. The load may then preferably be distributed along the surface of the bearing in accordance with a curve having the form of an isosceles triangle.

The hydrodynamic supporting power of such a bearing is an optimum because, if the above-mentioned conditions are maintained, the form of the lubricant space is a solution of the corresponding variation problem, as is hereinafter explained in greater detail. Further, the bearing in accordance with the invention operates equally well in both directions, that is to say, it can be used both for shafts rotating in any direction and for members making straight-line reciprocating movements. The bearing can thus be used with any sliding surface.

The thin film of lubricant produced in the bearing of the invention on which the supporting member or bearing liner floats in the operating condition has, however, not only a maximum hydrodynamic supporting power but also has a very small hydrodynamic friction. Owing to the decrease in the thickness of the film of lubricant, the lubricating devices are simplified because the bearing requires less lubricant and less heat is developed.

A particular advantage of the bearing according to the invention is, above all, that the contour or form of the lubricant gap remains constant in spite of the wear of the surfaces and in spite of elastic deformation of the resilient member because of its compensatory characteristics. The result is obtained at the same time that the necessary tolerances for the shape of the bearing and of the sliding surface are increased many times. Thus, if one part of the supporting or resilient member is worn, the material is altered in shape by the elastic forces and thus the original shape of the supporting member is substantially restored. If the supporting member has sufficient elasticity, the distribution of the load and therefore also the contour or shape of the lubricant in the gap is not substantially altered. Also, if the liner has sufficient elasticity, deformations and errors in the shape of the sliding surface, due, for example, to bending of the shaft or to the shaft having an elliptical shape, do not affect the shape of the lubricant gap since they are compensated for by relatively small and negligible elastic deformations of the supporting member. The elasticity is sufficient in most practical cases if the total deformation of the supporting member under the load is about 0.1 mm. or less, and in bearings of great precision it may even be only 0.01 mm.

In most practical cases it is advantageous to keep the pressure constant in a direction transverse to the direction in which the friction acts on the bearing. There is then no pressure gradient in this direction and therefore the lubricant does not flow towards the sides of the bearing. At the edge of the supporting member the pressure on the lubricant in any case should be equal to zero. Owing to the elasticity of the supporting member its edges are in contact with the sliding surface and prevent the outflow of lubricant at this place. The width of the regions of disturbance at these edges amounts only to a few thousandths of a millimetre which need not be taken into account. In the remaining regions in which friction occurs there is a strictly two-dimensional lubricating process. For this the known equation of Reynolds holds good.

$$\frac{dp}{dx} = 6\eta U \frac{h - h_0}{h^3} \quad (1)$$

In this equation $x$ is the co-ordinate in the direction of friction, $p$ the pressure, $\eta$ the viscosity, $U$ the relative velocity of the bearing to the moving surface, $h$ the height of the lubricant gap, $h_0$ the height of the lubricant gap at the point of maximum pressure.

In the above Equation 1 in the present case $p(x)$ and $$\frac{dp(x)}{dx}$$

are the known functions, and $h(x)$ is the function required. For the value $h_0$ for any value of $p(x)$ the following equation holds good:

$$h_0 = \sqrt{0.889 \eta U / \left(\frac{dp}{dx}\right)_{max}} \quad (2)$$

With a different loading, the functions $p(x)$ and $$\frac{dp(x)}{dx}$$

only differ in scale, that is to say, they are only multiplied by a factor. Consequently the function $h(x)$, too, only alters in scale. All its properties, for example the above-mentioned maximum supporting power, are therefore maintained.

In the Equation 2 the expression $$\left(\frac{dp}{dx}\right)_{max}$$

indicates the maximum value of the pressure gradient on the supporting member. If, for example, the elastic pressure on the front edge of the supporting member differs from zero, the pressure in the lubricant must suddenly increase at this place from zero up to this pressure value. The value $$\frac{dp}{dx}$$

is therefore infinite in this case and according to Equation 2 $h_0 = 0$. In such a case, therefore, no liquid friction is possible.

It is easy to obtain any form of pressure curve and therefore any desired form of lubricant gap. In this case a definite length of the supporting member is assumed and the form of the lubricant gap with which the supporting member carries the maximum load has then to be found. In doing so, the average $h_0$ or the minimum height $h_{min}$ of the lubricant gap have to be considered as given. The optimum shape of the lubricant gap is not of as much practical interest as the form of the pressure curve corresponding to it. Only the practically important case of symmetrical pressure curves will be considered, because in this case the supporting member will operate equally well in both directions. The answer to this problem is that the pressure curve must have the form of an isosceles triangle which has already been mentioned as one of the features of this invention.

Further features of the invention will be clear from the following description taken in conjunction with the accompanying drawing. The drawing illustrates an example of a bearing in accordance with the invention, and in it Figure 1 is an axial section through the bearing taken on the line $a$—$b$ of Figure 2, Figure 2 is an end elevation partly in section of the bearing, Figure 3 is a detail view on a larger scale of a part of Figure 2, Figures 4, 5 and 6 show diagrammatically the action of the elastic supporting member when the shaft is at rest (Fig. 4), when it is rotating in a clockwise sense (Fig. 5) and when the shaft is rotating in an anti-clockwise sense (Fig. 6).

Referring to Figures 1 and 2, the numeral 1 indicates the outer ring of the bearing and the numeral 2 a load-distributing member which carries the load and forms with intermediate pieces 4 a load distribution means, said distributing member 2 and intermediate pieces 4 constituting relatively movable members. Member 2 has structural deformations such as notches formed in one side thereof. The numeral 3 represents a liner or layer of elastic material, for example of plastic material, constituting a resilient bearing member of about 1 mm. thickness. The two intermediate pieces 4 have complementary structural deformations such as pointed extremities which form prism joints with the notches on the pressure-distributing member 2, the pointed ends or extremities engaging the corresponding notches in said distributing member. The angle formed by the sides of each of said pointed extremities is smaller than that of the corresponding notch in distributing member 2, thus forming a pivotal connection between said intermediate pieces 4 and said distributing member 2 and permitting limited rotational movement of said pieces relative to said distributing member. The numeral 5 designates a shaft which may rotate in either direction. The free spaces within the outer ring are filled with porous material 6, for example of felt. This material collects the oil which is pressed out towards the sides by the pieces 4 and transfers it by capillary action to the surface of the shaft. The outer ring 1 is preferably made in two parts for facilitating manufacture. A layer of packing or sealing material 7, for example of rubber, is interposed between the two parts.

In Figure 3, the part enclosed in a circle in Figure 2 is illustrated on a larger scale. The adjacent edges of the two intermediate pieces 4 which face the layer 3 enclose the packing strip 8 which is introduced during manufacture to prevent the escape of the still liquid chemical components of layer 3 prior to its solidification.

In the Figures 4–6, the elastic layer or liner 3 is diagrammatically represented as a series of springs which press against a thin flexible sheet. The layer or liner 3 shown in this manner corresponds to the elastic liner 3 of Figures 1–3. Figures 4–6 also show the pressure curve $p(x)$ which has the form of an isosceles triangle. Regardless of the direction of rotation of the shafts 5 there are formed between the layer 3 and the surface of the shaft 5 layers of oil such that the pressure curve retains its shape of an isosceles triangle.

The outer ring 1, the pressure-distributing member 2 and the intermediate pieces 4 can be made of steel and can be hardened. The layer 3 can consist of a phenol- or cresol-formaldehyde condensation product or of hard paper. The shaft 5 may be made of any suitable material. It must be highly polished. In general, however, its diameter and shape need not be extremely accurate. The jointed construction of the intermediate pieces 4 in cooperation on the one hand with the load distributor 2 and on the other hand with the elastic liner 3 enables the bearing to adapt itself to all unevennesses in the shaft.

The bearing should operate with the layer of lubricant having a thickness of 2–5 microns; then the thickness of the layer of oil behind each support consisting of the parts 2, 3 and 4 is approximately half as thick as the average thickness of the hydrodynamic lubricating layer below the said support. Such a thin free layer or film of oil has very strong capillary properties. On contact, it draws the oil with great power from the porous filling 6 of the bearing.

Having thus described the invention, what is claimed as new and desired to be secured by Letters Patent, is:

1. A hydrodynamic bearing comprising at least one bearing unit including an outer ring member, at least one load distributing member defined by an outer surface of a larger curvature than the inner surface of said outer ring member with which said distributing member makes contact, said distributing member being further defined by an inner surface provided with two notches having walls diverging toward the axis of said bearing, adjacent walls of said notches converging toward said axis, intermediate means provided with pointed ends shaped for engagement with said notches, respectively, said intermediate means being constructed to permit limited rotational movement relative to said notches, an elastic liner in contact with said intermediate means and remote from said notches, a packing element placed between said intermediate means and supported by said liner, and means extending laterally supported within said outer ring member of said bearing unit and adapted to supply said bearing unit with lubricant, the axis of said bearing substantially coinciding with the axis of a shaft, when the latter is engaged by said bearing unit.

2. A hydrodynamic bearing for a shaft comprising at least one bearing unit including an outer ring member, at least one load distributing member defined by an outer surface of a larger curvature than the inner surface of said outer ring member with which said distributing member makes contact, said distributing member being further defined by an inner surface provided with two notches, said notches being bounded by walls diverging toward the axis of said bearing, walls of said notches positioned adjacent each other converging toward said axis, intermediate means provided with ends shaped for engagement with said notches, respectively, and constituting prism joint means, said prism joint means being constructed to permit limited rotational movement of said intermediate means relative to said notches, elastic liner means in contact with said intermediate means and located remote from said prism joint means, and means supported within said outer ring member of said bearing unit and adapted to supply said bearing unit with lubricant whereby said liner means upon movement of said shaft and when in contact with a lubricant is deformed to thereby maintain substantially the same relative distribution of pressure along a portion of said shaft opposite said liner means as when said shaft is at rest.

3. A bearing having an outer ring member and at least one resilient bearing member, said bearing member being positionable close to and in conforming relation with the surface of a shaft when said bearing is mounted thereon, load distribution means intermediate said resilient bearing member and said outer ring member, said distribution means comprising a plurality of relatively movable members, at least one of said movable members contacting said outer ring member and at least another one of said movable members contacting said resilient bearing member, whereby pressure exerted by a load will be at a maximum in the middle of said bearing member and zero at both ends thereof, and lubricant supply means disposed adjacent said distribution means for maintaining a lubricant film between the surface of the shaft when located in said bearing and said bearing member during operation of said shaft.

4. A bearing in accordance with claim 3, there being a lubricant gap formed between said resilient bearing member and the surface of said shaft when said shaft is located in said bearing, the shape of said gap being chosen so that said distribution means is adapted to coact with said shaft to thereby produce a pressure which follows a curve in the form of an isosceles triangle, the base of which triangle is commensurate with the length of said resilient bearing member.

5. A bearing in accordance with claim 3, in which said resilient bearing member comprises a strip of artificial material of about 1 mm. thickness, said material being a condensation product of formaldehyde and a phenol.

6. A bearing according to claim 5, said load distribution means including two intermediate pieces in contact with said strip.

7. A bearing according to claim 6, said load distribution means further including a load distributing member, said intermediate pieces and said distributing member being pivotally connected by means of prism joints.

8. A bearing according to claim 7, said lubricant supply means comprising a lubricant absorbent material supported within said outer ring member adjacent said distribution means.

9. A bearing according to claim 7, including a packing strip enclosed between adjacent edges of said two intermediate pieces.

10. A bearing comprising at least one bearing unit including an outer ring member, at least one load distributing member defined by an outer surface of a larger curvature than the inner surface of said outer ring member with which said distributing member makes contact, said distributing member being further defined by an inner surface provided with at least one deformation, intermediate means provided with at least one complementary deformation facing said deformation on said distributing member and shaped for engagement therewith, one of said deformations being smaller than the other to permit limited relative rotational movement between said distributing member and said intermediate means, an elastic liner in contact with said intermediate means and remote from said deformations, said liner being adapted to come in contact with the surface of a shaft when said bearing is mounted thereon, a packing element placed adjacent said intermediate means and supported by said liner, and means supported within the outer ring member of said bearing unit and adapted to supply said bearing unit with lubricant.

References Cited in the file of this patent

UNITED STATES PATENTS

| | | |
|---|---|---|
| 1,161,721 | Parsons | Nov. 23, 1915 |
| 2,538,746 | Dall | Jan. 23, 1951 |
| 2,592,229 | Alexay | Apr. 8, 1952 |

FOREIGN PATENTS

| | | |
|---|---|---|
| 638,113 | Great Britain | May 31, 1950 |